(12) United States Patent
Hamer

(10) Patent No.: US 9,229,703 B1
(45) Date of Patent: *Jan. 5, 2016

(54) USER CONTROLLED ENVIRONMENT UPDATES IN SERVER CLUSTER

(71) Applicant: Amazon Technologies, Inc., Reno, NV (US)

(72) Inventor: Kenneth L. Hamer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,423

(22) Filed: Nov. 25, 2013

Related U.S. Application Data

(63) Continuation of application No. 12/398,035, filed on Mar. 4, 2009, now Pat. No. 8,595,714.

(51) Int. Cl.
*G06F 9/445* (2006.01)

(52) U.S. Cl.
CPC ... *G06F 8/65* (2013.01); *G06F 8/61* (2013.01)

(58) Field of Classification Search
None
See application file for complete search history.

(56) References Cited

U.S. PATENT DOCUMENTS

| | | | |
|---|---|---|---|
| 6,418,555 B2 * | 7/2002 | Mohammed | 717/169 |
| 6,704,778 B1 * | 3/2004 | Horman | 709/220 |
| 7,237,238 B2 * | 6/2007 | Peppers et al. | 717/170 |
| 7,370,101 B1 * | 5/2008 | Lakkapragada et al. | 709/223 |
| 7,577,722 B1 * | 8/2009 | Khandekar et al. | 709/220 |
| 7,937,455 B2 * | 5/2011 | Saha et al. | 709/220 |
| 2003/0229695 A1 * | 12/2003 | Mc Bride | 709/224 |
| 2004/0015831 A1 * | 1/2004 | Bowhill | 717/106 |
| 2006/0020641 A1 * | 1/2006 | Walsh et al. | 707/203 |
| 2006/0037016 A1 * | 2/2006 | Saha et al. | 717/178 |
| 2008/0140930 A1 * | 6/2008 | Hotchkiss | 711/114 |
| 2008/0148248 A1 * | 6/2008 | Volkmer et al. | 717/168 |
| 2008/0172445 A1 * | 7/2008 | Zaidelson et al. | 709/201 |
| 2008/0295064 A1 * | 11/2008 | Mitra et al. | 717/100 |
| 2009/0089625 A1 * | 4/2009 | Kannappan et al. | 714/39 |
| 2009/0199116 A1 * | 8/2009 | von Eicken et al. | 715/764 |
| 2009/0217244 A1 * | 8/2009 | Bozak et al. | 717/124 |
| 2009/0241030 A1 * | 9/2009 | von Eicken et al. | 715/735 |
| 2009/0282404 A1 * | 11/2009 | Khandekar et al. | 718/1 |
| 2010/0125712 A1 * | 5/2010 | Murase et al. | 711/162 |
| 2010/0250732 A1 * | 9/2010 | Bucknell | 709/224 |
| 2010/0313199 A1 * | 12/2010 | Chen et al. | 717/177 |
| 2011/0185357 A1 * | 7/2011 | Hashimoto et al. | 718/1 |
| 2011/0251992 A1 * | 10/2011 | Bethlehem et al. | 707/610 |
| 2011/0283339 A1 * | 11/2011 | Smith | 726/4 |
| 2013/0060919 A1 * | 3/2013 | Khandekar et al. | 709/220 |

* cited by examiner

*Primary Examiner* — Isaac T Tecklu
(74) *Attorney, Agent, or Firm* — Lee & Hayes, PLLC

(57) ABSTRACT

A system and method of deploying operating environments in an enterprise computing environment comprised of managed virtual or hardware servers is disclosed. A library of operating environments, each environment including at least one package including an operating system image and an application, is provided. A user controlling a cluster of servers may request creation of a test environment using an operating environment from the library, and test the environment with applications to ensure the user's needs are met. The user may request all servers within the user's cluster be provisioned with the operating environment through a deployment manager.

20 Claims, 8 Drawing Sheets

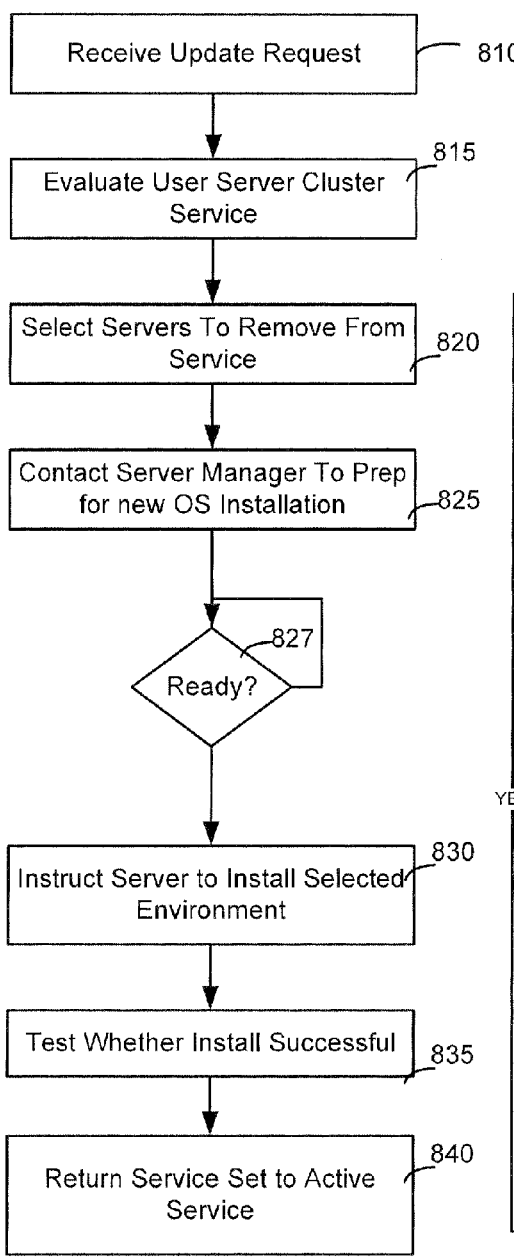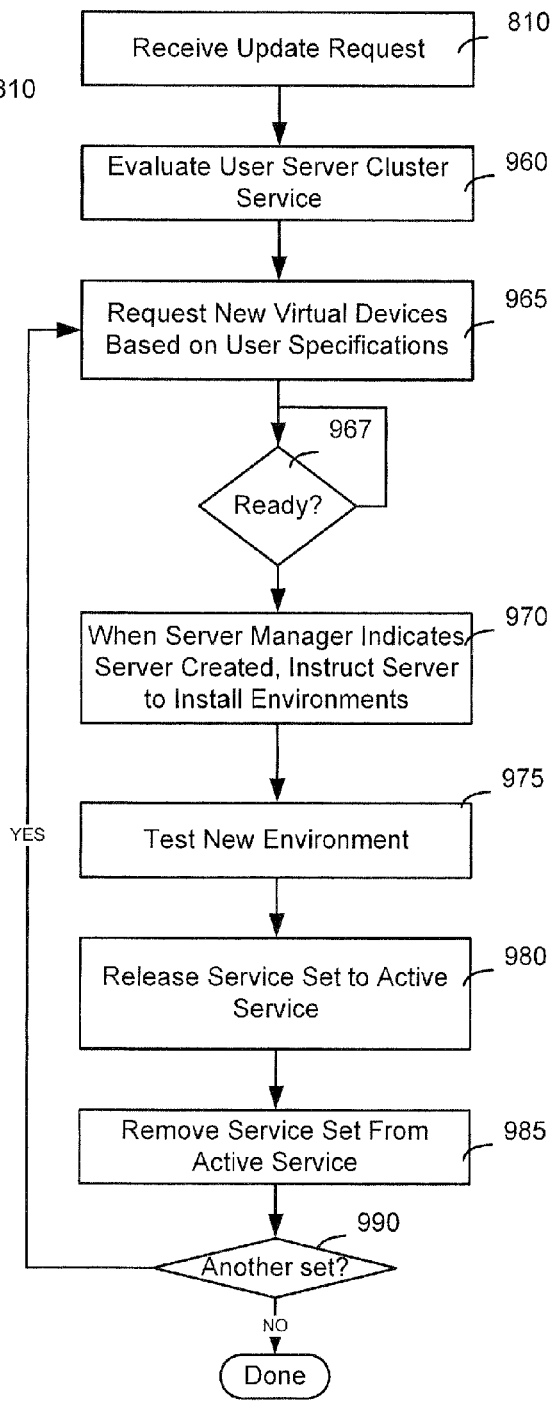

USER CONTROLLED ENVIRONMENT UPDATES IN SERVER CLUSTER

CROSS-REFERENCES TO RELATED APPLICATIONS

This application is a continuation of U.S. application Ser. No. 12/398,035, entitled "User Controlled Environment Updates In Server Cluster," filed Mar. 4, 2009, and issuing as U.S. Pat. No. 8,595,714, of which the full disclosure of this application is incorporated herein by reference for all purposes.

BACKGROUND

Administrators of enterprise computing environments face numerous challenges. Enterprise computing environments typically consist of a plurality of virtual or hardware servers that provide distributed functions to an enterprise, or which may be divided into smaller clusters for specific purposes. Individual servers or clusters may be dedicated to users who utilize the cluster for user-defined services or tasks under the user's control. The enterprise administrator maintains the server environments to ensure that the latest available operating systems and applications are provided in the environment.

In the context of an enterprise computing environment, a server may comprise a physical computing device or one or more virtual servers supported by physical hardware. In many cases, the processing hardware in the computing environment will not be uniform—various different types of hardware configurations, from various manufacturers, make up an enterprise computing environment. An advantage of virtualized servers is that they generally appear the same, independent of the physical hardware used to create them.

A typical server has a processing capacity, an operating system, one or more applications, non-volatile memory storing the applications and volatile memory allowing the processing unit to operate on the instructions for implementing the applications. In a physical server, these elements are fixed by the hardware, while in a virtual environment, specifications of the processing capacity and the server environment can be constructed in accordance with a desired environment.

A system management server may provide management of the multitude of processing devices. The system management server maintains records on the status of each of the processing devices in the enterprise environment and allows changes to be made to the environment under the control of a central authority.

BRIEF DESCRIPTION OF THE DRAWINGS

FIG. 8 illustrates a method performed by a deployment manager to deploy operating environments in a hardware based enterprise computing environment.

FIG. 9 illustrates a method performed by a deployment manager to deploy operating environments in a virtual machine based enterprise computing environment.

DESCRIPTION

Technology is presented which provides users of clusters in enterprise computing environments with the ability to manage updates to their clustered servers under user control. Enterprise administrators may provide a series of operating systems and applications to users of the enterprise computing environment, who then decide whether and when to update the operating systems and applications on their systems. Prior to installing operating environments in user-controlled servers, the technology allows users to test the environment for application compatibility. The technology also provides a mechanism for the user to easily update their environments at a time of their choosing, and after specific testing has taken place.

An enterprise computing environment generally consists of a number of virtual or hardware based servers managed by one or more enterprise administrators. The enterprise administrator may be an individual or entity which is authorized to manage the enterprise computing environment. One use of an enterprise computing environment is as a clustered environment, with user-controlled clusters of processing devices performing processing tasks under the control of various users of the cluster. The enterprise administrator performs functions such as assigning servers and clusters to users, distributing operating system updates, managing user load requirements, and maintaining the virtual or physical hardware components of the environment. In one alternative, the enterprise administrator may also provide various applications for use by the users within their cluster. Users may also develop and utilize their own applications on servers within their cluster. In this context, a user is defined as any individual or entity having authority to create, destroy or modify servers within a server cluster under the user's control.

Figure 1:
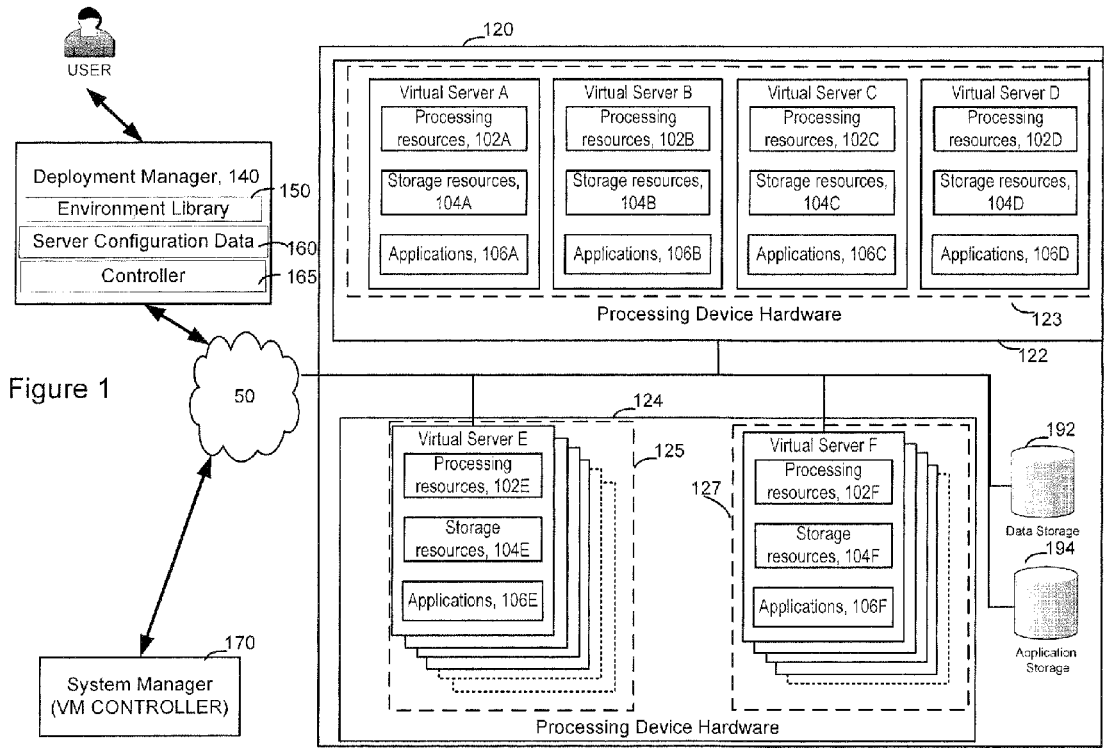
FIGS. 1 and 2 depict environments suitable for utilizing the technology disclosed herein.
Figure 2:
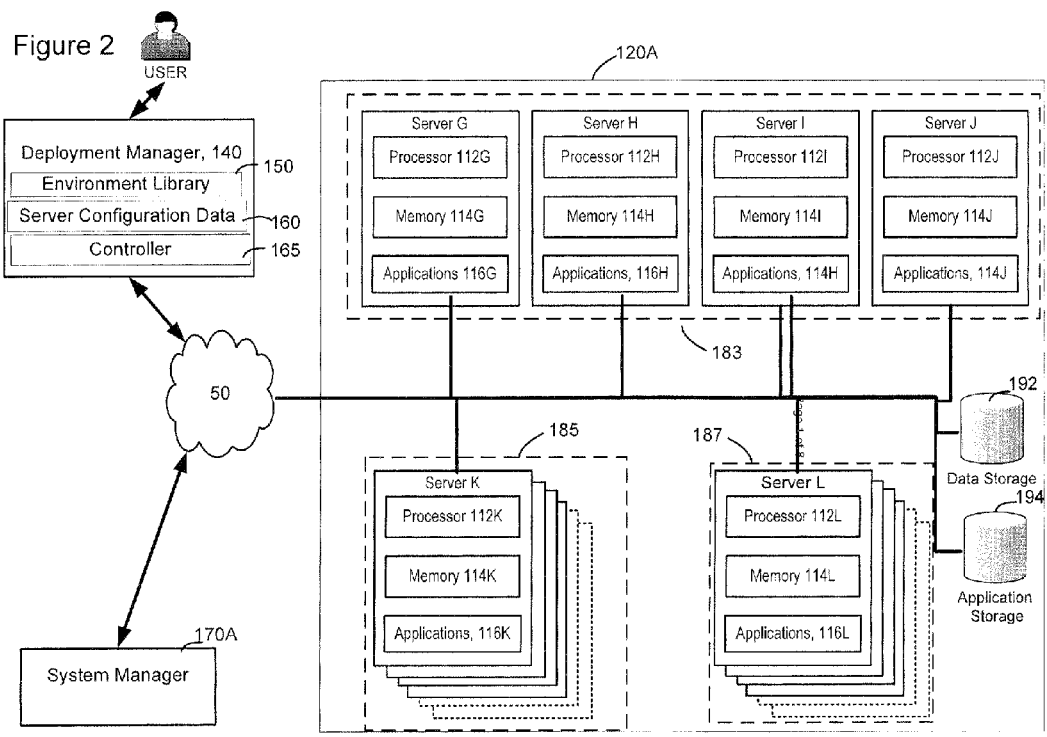

The technology may be utilized in various computing environments. FIG. 1 illustrates an enterprise computing environment 120 utilizing virtual servers. FIG. 2 illustrates an enterprise computing environment 120A utilizing hardware based servers.

FIG. 1 shows deployment manager 140, a system manager 170 and enterprise computing environment 120. The deployment manager 140 and system manager 170 may comprise code for instructing one or more computing devices (illustrated in FIG. 10) to complete the functions described for each component as described herein. In general, the deployment manger 140 allows users to control the installation of new operating environments for their clusters. The system manager 170 comprises a server management component that maintains information on, and controls interaction with, each of the servers in the enterprise computing environment 120. Deployment manager 140 includes an environment library 150 and server configuration data 160. The environment library 150 and server configuration data 160 are used by the deployment manager 140, as described below.

Enterprise computing environment 120 may include one or more clusters 123, 125, 127 of servers. In FIG. 1, the clusters are illustrated as comprising virtual server clusters. Virtual server clusters are maintained on one or more hardware devices 122, 124. Each hardware device 122, 124 may support one or more virtual servers. In FIG. 1, hardware 122 supports a first cluster 123 of virtual servers A through D.

Hardware 124 supports two clusters, 125, 127, with cluster 125 illustrated as including virtual server E and other virtual servers, and cluster 127 including virtual server F and other virtual servers. Each virtual server (A-F) may comprise a partition of physical hardware into a processing environment including processing resources, storage resources, networking resources and memory resources. Each virtual server includes corresponding processing resources 102A-102F, storage resources 104A-104F and applications 106A-106F operating on the respective virtual server. Each physical device can be divided into a multitude of virtual servers each of which has the appearance and capability of a dedicated computing device. Each virtual server can run its own operating system and applications, and can be independently rebooted, created and destroyed. Each virtual server can be created and destroyed within the physical computing environment relatively quickly and easily. This allows different operating systems and applications to be installed without affecting other applications or operating systems running in other environments on the processing device hardware.

System manager 170 in FIG. 1 comprises a virtual environment controller. In a virtualized server environment, the system manager creates virtual servers using one or more virtualization technologies. Generally, a virtualization technology allows multiple operating system instances to run concurrently on a single computer, sharing the resources of that computer. Any number of suitable virtualization technologies may be utilized in accordance with the present technology to allow separation of requests made to an operating system from the physical delivery of a response to that request from a hardware device. System manager 170 includes instructions to allow the creation, maintenance and destruction of virtual servers on hardware within the enterprise computing environment 120. It will be noted that while a limited number of virtual servers and physical hardware devices are illustrated in enterprise computing environment 120, any number of hardware devices and virtual servers operating on each of the hardware devices may be utilized concurrent with the present technology.

FIG. 2 illustrates an enterprise computing environment 120A comprising hardware servers. Enterprise computing environment 120A is similar to environment 120, however processing environments are constrained to physical servers rather than virtual servers. In the physical server environment, each server G-J includes an associated processor 112 (112G-112L), volatile and a nonvolatile storage 114 (114G-114L), and one or more applications 116 (116G-116L). Enterprise computing environment 120A may include a wide variety of different physical hardware systems each having different physical hardware components. Clusters may be organized from similar hardware systems or different hardware systems. Three clusters 183, 185 and 187 are illustrated in FIG. 2, but any number of clusters comprising one or more servers may be included in the enterprise computing environment 120A.

In enterprise computing environment 120A, the system manager 170A is a systems maintenance controller designed to manage large groups of servers. The system maintenance controller may be any of a number of known technologies that provides enterprise-wide administration of distributed computing systems including, but not limited to, hardware inventory functions, server availability monitoring and metrics, software inventory installation, user activity monitoring, capacity monitoring, security management, storage management and network utilization monitoring.

It will be recognized that an enterprise computing environment may be a combination of virtualized servers and physical servers. The environments may also include shared data storage resources 192 and shared application resources 194. Any of the servers in the environments may utilize the shared storage resources 192 or shared application resources 194 to mount applications and storage volumes remotely.

Enterprise computing environment 120, 120A may contain various subsets or clusters of processing devices, each under the control of a different authorized user. In one embodiment, users maintain control over various functions of their virtual or real servers, and provide their own set of applications that are outside of the control of the enterprise administrator. Users may also make use of applications developed by the enterprise administrator, or third party applications distributed and approved by the enterprise administrator, in the user's cluster.

In both illustrated enterprise computing environments 120 and 120A, a deployment manager 140 provides new operating environments to the servers. Environment packages (illustrated in FIG. 3) are contained in the environment library 150, and may comprise an operating system, and application, or an operating system in combination with one or more applications. Each environment package is comprised of one or more component packages which are used to create the environment on a virtual or hardware server. The environment library 150, maintained in the deployment manger 140, is a catalog of operating system images and applications approved and audited by the enterprise administrator. The enterprise administrator generally performs approval and auditing before releasing an environment to the library. In certain instances, the enterprise administrator may release non-approved or audited applications and operating systems to the library for use by users. Each component package within an environment package includes, for example, an operating system image and application components. Additional details on the environment library are described below.

Applications stored in the environment library may be developed by the administrator or by third party developers. Other applications, not provided in the library, may be created and maintained by users themselves. In some cases, third party developers and users providing their own application may not have control over the operating systems on which their applications are utilized. Developers and users may therefore wish to test their applications in new operating environments in a test environment, before deploying the application to a cluster providing needed services, referred to herein as a production environment. The deployment manager 140 allows third party application developers and users to choose when such applications are distributed to various server environments within controlled server clusters.

In both environments 102/120A, the deployment manager 140 may operate on a separate physical server, or within its own virtual server within the enterprise computing environment, or may connect to the processing environment 120/120A via network 50 which may be a physical network, or a series of public and private networks such as the Internet. Applications and operating systems may be deployed to real and virtual servers using the deployment manager 140. The deployment manager also maintains server configuration data 160, also described below, which reflects information on each of the virtual servers or physical servers in the enterprise computing environment 120, 120A.

Deployment manager 140 also includes a controller 165 which communicates with system manager 170/170A to control server activities required to implement operating environments. As discussed below, the deployment manager 140 can direct the system manager 170/170A to install operating environments in all or a portion of a user's cluster based on requirements defined by the user. The user interacts with the deployment manager 140 to control deployment of operating environments to clusters within enterprise computing environment 120, 120A.

As noted, an operating environment may include an operating system. Any number of different operating systems may be utilized with the present technology, including but not limited to various configurations of Linux, Unix, Microsoft Windows Server, and other server operating systems. Applications can consist of both enterprise administrator provided applications, such as database servers, web servers, virtual machine environments, media servers and the like, or user-specific applications, created by the user and maintained by the user on individual operating systems.

Figure 3:
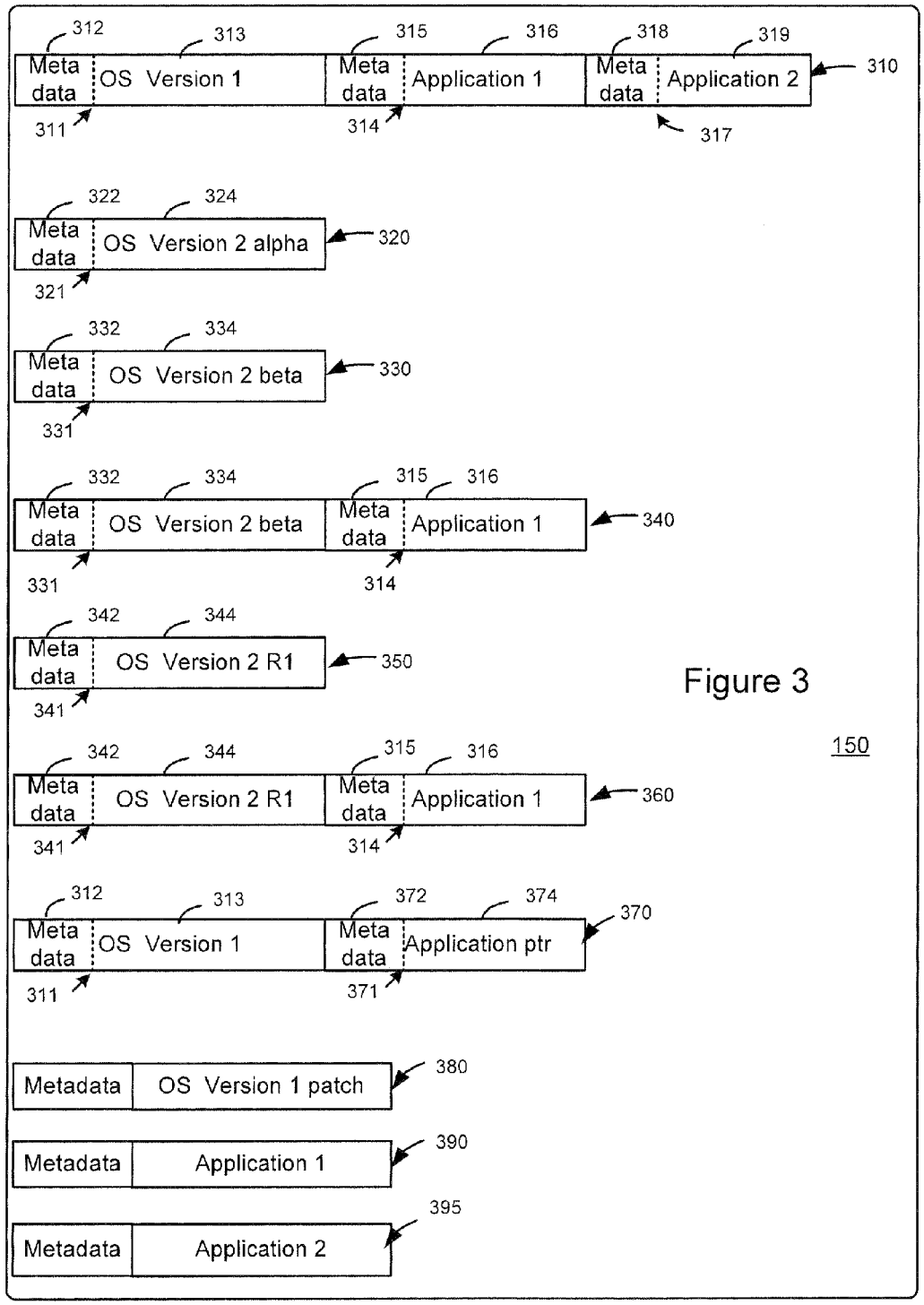
FIG. 3 illustrates an environment library in accordance with the technology.

FIG. 3 is a depiction of the operating environment library 150. The environment library is made up of numerous sets of operating environments 310, 320, 330, 340, 350, 360, 370, 380, 390, 395. Each operating environment comprises one or more packages and metadata associated with the package. For example, environment 310, includes individual packages 311, 314, 317. Each package may comprise either an operating system or an application. Package 311 is an operating system, designated "OS Version 1", and includes an image 313 of the operating system and metadata 312 defining usage parameters of OS Version 1. Package 314 is an application, designated "Application 1", and includes application components 316 and metadata 315 defining installation parameters of the application. Likewise, package 317 is another application, designated Application 2, and includes application components 319 and metadata 318 associated with the application.

Each individual package can include an executable, a binary image, a library, configuration files, or any type of file or data used to create an operating environment. In the context of the present technology, each OS version illustrated in FIG. 3 is provided as a binary image. As will be well understood by those skilled in the art, images can be written directly into a processing environment to allow the rapid establishment of an operating system in the environment. Application packages may comprise executables, configuration files, and libraries along with configuration information, to allow the application to run on top of an operating system. Package metadata can include system guidance information such as recommended operating system versions associated with an application, approved operating system hardware configuration, and operating system status information (e.g. "released", "recalled", "deprecated"). Other metadata may include compatibility information relative to interoperability with other applications, the suitability for use of an application on an operating system, and installation rules for applications and operating systems.

As illustrated in FIG. 3, each operating environment 310-395 may be comprised of various different combinations of packages. For example, operating environment 310 includes an operating system package 311 and application packages 314, 317. Operating environments 320, 330, 350 are operating systems alone. Numerous variations on the construction and contents of environments may be included in library 150.

Revisions or updates to operating systems may be released as environments individually, or in a package with an included application. Package 320 illustrates a new operating system version, designated "OS Version 2 alpha" 324. Package 320 includes metadata 322 associated with OS Version 2 alpha. Similarly, a next or "beta" version of "OS Version 2" is illustrated in environment 330, where package 331 includes an image 334 of the operating system and associated metadata 332. Environments 320, 330 and 350 illustrate the ability to stage operating system version releases for compliance with testing procedures. In this example, OS Version 2 is released as a stand-alone environment in an alpha 320, beta 330, and "released" or "R1" version 350.

Operating Environments may combine existing or new applications with newer releases of operating systems. For example, operating environment 340 includes package 331 of OS Version 2 beta, and package 314 which includes Application 1. Operating environment 340 allows a user to test the viability of using Application 1 in combination with the OS Version 2 beta release. Similarly, operating environment 360 includes a package 341 of a first release ("R1") of OS Version 2 and package 314 including Application 1. In addition to various combinations of operating systems and applications, an operating environment may comprise an operating system version and a pointer to an application or an instruction to mount the application from a shared network storage location. Operating environment 370 illustrates this variant, where package 311 includes OS Version 1 and is combined with package 371 which comprises an application pointer 374 and associated metadata 372. In another variation, operating system patches may be included in the operating environment as illustrated by operating environment 380. In this context, a patch may include files, libraries or executables, or images including portions of the operating system, any of which update components of an operating system. An operating system patch 380 may be contained in an operating environment and the metadata associated with the patch may include instructions to the system manager 170, 170A concerning installation of the patch. Likewise, as illustrated at 390 and 395, the operating environment may be comprised solely of application packages along with their associated metadata.

In still another variant, partial or focused operating environments may be included in the library. Typically, operating systems include components to allow the operating system to be adapted to different types of hardware and provide services to run different types of applications. A focused operating system would provide only those services and components necessary to run on specific hardware or in a specific virtual environment, and support one or more specific applications. Hence, various device drivers and service components not required for operation on the hardware or to support the service could be omitted, thus reducing the overall size of the operating environment.

Figure 4:
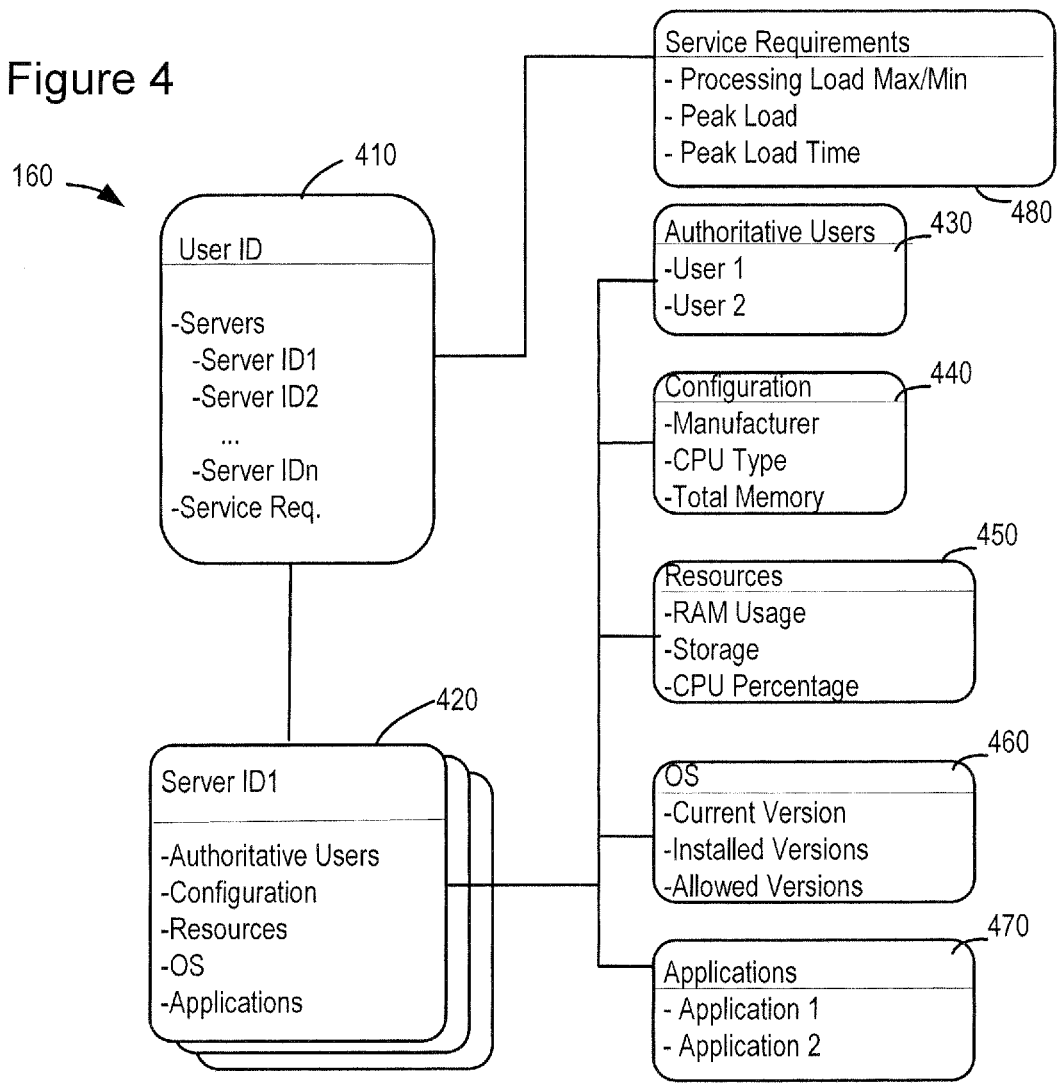
FIG. 4 illustrates a server configuration data structure utilized with the present technology.

FIG. 4 illustrates an example of a server configuration data 160 maintained by the deployment manager 140. Numerous different types of data structures and elements of data may be maintained by the deployment manager 140. As illustrated in FIG. 4, one example of server configuration data 160 includes an instance of a user record 410. The user record 410 may uniquely identify a user by reference to a user ID and include a reference to all servers in the user's cluster. The user record 410 includes references to individual server records 420, and a service requirements record 480. Each server record 420 includes a reference to a record 430 maintaining authoritative users (e.g. users having authority to make changes to the configuration), a hardware configuration record 440, a resources record 450 defining physical resources which may required by the user, an operating system record 460 specified for the server, and an applications record 470 listing the applications installed on the particular server. An authority record 430 will maintain a list of users authorized to make changes to the server's configuration and may include, for example, various levels of security authority. Configuration data record 440 may include hardware configuration information such as hardware manufacturer, the CPU type, total memory, and total storage available on the particular hardware used by the server. Resource data record 450 maintains information concerning the specific requirements of, for example, a virtualized server. This may include the amount of RAM available, the amount of storage required, the CPU resources required, and other information to enable the system manager to define a virtual server. The OS record 460 maintains a record of the current version of the operating system installed in the server, other installed versions which may be present on the server, and versions which may be allowed to be installed on the server. The applications record 470 includes information on installed applications that are allowed on the specific server. It will be understood that the structure shown in FIG. 4 is exemplary, and may include additional information or less information, as needed, to enable maintenance of user clusters in accordance with the present technology.

A service requirements record 480 may include information on the user's service needs. This record may include items such as the user's processing load needs, the recorded peak processing load seen for the user, the peak load history (times of usage) and other information. The processing load need can be a user specified item, or can be determined by calculating processing requirements of the individual server and/or the cluster as a whole. This can be used to determine when to implement maintenance and upgrade processes discussed herein. In one embodiment, records stored in the service requirements record 480 may be used by the deployment manager in determining a best practice for implementing updates to the user's cluster.

Figure 5:
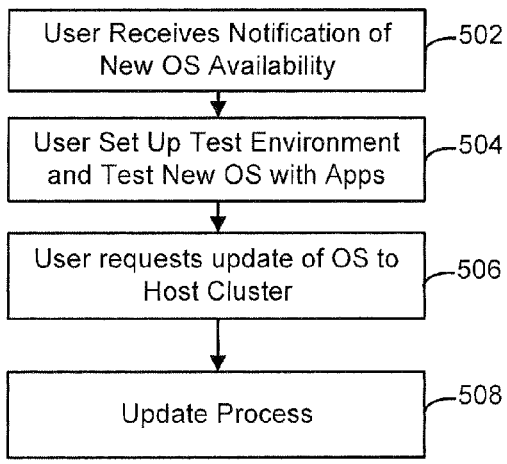
FIG. 5 illustrates a user update control method.

FIG. 5 illustrates a method by which a user may utilize the deployment manager to control deployment of data to the servers under the user's control. FIG. 5 is described in the context of an operating system. However, it will be understood that the environment many contain any number of updated or changed packages which a user may be interested in applying to their server set.

At 502 the user will receive notification of the availability of a new operating system or a new version of an operating system. In 504, the user can initiate testing of the new operating system or operating system version on a test server with the relevant applications that the user maintains and utilizes. One advantage of the present technology is that users are allowed to implement user-defined testing prior to an update of environments on user clusters. This is advantageous in ensuring that environment updates provide adequate services and stability for a user's particular requirements. Creation of a test environment and testing within the environment is described with respect to FIGS. 7A and 7B.

In 506, based on the testing results, if the user concludes that they wish to update their server set, the user can initiate an update process. At 508, the update process is controlled by the deployment manager 140 utilizing the system manager 170 or 170A. The update process is described with respect to FIGS. 8 and 9.

Figure 6:
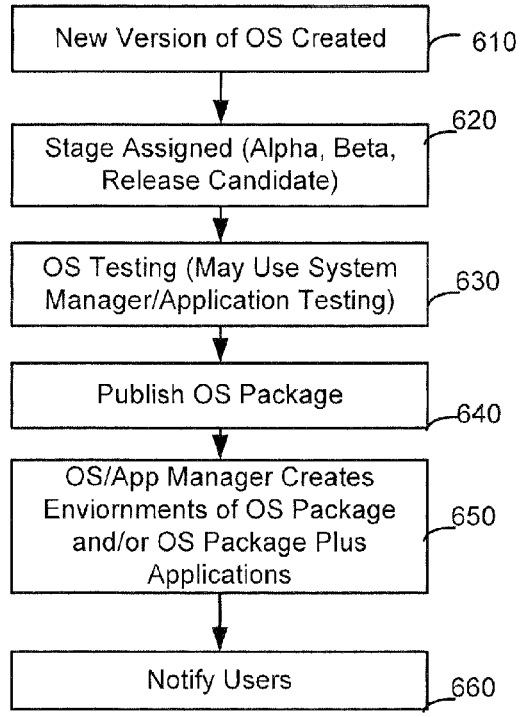
FIG. 6 illustrates an operating system update method.

FIG. 6 illustrates the process of developing and releasing a new version of an operating system that may be performed by the enterprise administrator. At 610, a new version of an operating system is completed. Operating system development may occur by the enterprise administrator or third party developers who provide updated versions of the OS to the enterprise administrator. At 620, staging identification is assigned to the operating system. A staging assignment allows users to quickly identify whether or not the operating system is one which the user wishes to consider testing with the user's systems. Typical staging assignments include "alpha", "beta", "release candidate", and "released". At 630, operating system testing may be performed by the enterprise administrator prior to release of the operating environment containing the operating system to the environment library. Operating system testing by the enterprise administrator may include testing interoperability with applications developed by the enterprise administrator, or developed by third parties and supported by the enterprise administrator. Testing by the enterprise administrator may or may not be as extensive as that performed by a user as discussed below at 750.

It will be recognized that the operating system testing may be performed utilizing the technology discussed herein. That is, the operating system may be converted to an image and the image used to create an environment which is then installed in a physical or virtual server in order to test the operating system against different applications and under different operating environments. Operating systems may require different types of hardware components since not all components react identically to OS instructions. Similarly, testing may occur in virtualized environments, though one advantage of virtualized environments created by the same virtualization technology is that the virtualized server is designed to act in same manner relative to the operating system and applications irrespective of the physical hardware.

Once testing is completed, at 640, the operating system package is published to the deployment manager environment library 150. The deployment manager 140 creates environments of OS packages and/or OS packages plus applications at 650 and stores them in the environment library 150. Users are then notified at 660. Once a user wishes to set up a new server and test new environments with given applications (as described at 504 above), the creation of a new server will proceed depending on whether one is utilizing a hardware environment 120A or a virtualized environment 120.

Figure 7A:
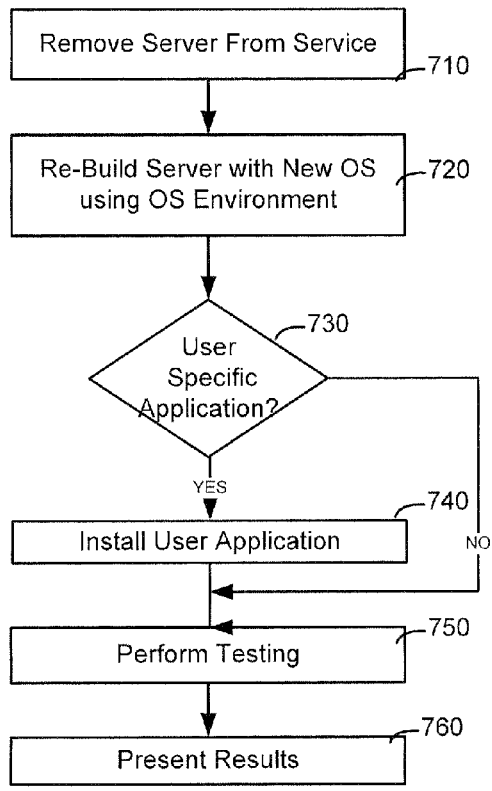
FIGS. 7A and 7B illustrate test environment creation methods.
Figure 7B:
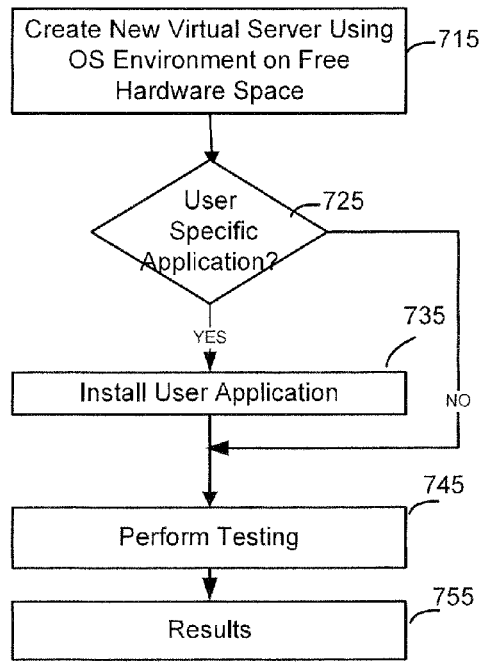

FIGS. 7A and 7B illustrate creation of a test environment (at 504, above) in a physical enterprise computing environment 120A or virtual enterprise computing environment 120, respectively. FIG. 7A illustrates the workflow which occurs when a user seeks to perform testing in a hardware-based server environment. Typically, in a hardware environment, a user will have a specific number of physical servers under the user's control in a production environment. In order to create a test environment, it may be necessary to remove one or more of those servers from the production environment to utilize the server for the test environment. At 710, one or more servers in the user's sub-cluster will be removed from the production environment. At 720, the removed server will be rebuilt with the new operating system using the specified environment package from the deployment manager. The environment package may be an updated operating system, an updated application or applications, or a combination of updated applications and/or operating systems.

At 720, the deployment manager utilizes the functionality present in the system manager 170A to remove the old operating environment (remove the operating system and potentially, any applications on the server) and install the new environment. In the hardware based cluster, this will include removing the server from the production environment service, creating the installation location (such as a partition in non-volatile storage suitable for installation of the OS image) on the server, and notifying the deployment manger that the process of creating a new environment location on the hardware is complete. Before a server is removed from service, the server manager must ensure that services provided by the server are migrated to other servers, to avoid any disruption to the user's cluster. If specific data, content or objects are present on the server, the system manager 170 ensures that the information is stored for migration to the updated environment once the creation of the new environment is complete.

Various hardware system managers include the capability to deploy operating systems directly and perform the aforementioned tasks. Alternatively, creation of the server can be performed manually.

Once the new test server environment is created at 720, at 730, if a user's own application code (not available from the library 150) is to be installed, installation of user specific applications occur at 740. If no user specific application is installed or after the user's specific application is installed, then testing can be performed at 750. The nature and extent of the testing which occurs at 750 can vary widely. Generally, this includes testing applications on a new or updated operating system to determine whether all scenarios which may be presented to the application or operating system will be performed adequately and stably by the application. Once testing is completed, results 760 provide the user with the opportunity to make the decision at 506, discussed above, as to whether or not to upgrade the server cluster production environment to the new environment.

FIG. 7B illustrates the process of setting up a test server in a virtualized environment. Because the availability of virtualized servers is limited only by the availability of additional hardware capacity to maintain the servers, a new test virtual server using the new or updated environment can be created in free hardware space at 715. Creation of the new server occurs through instructions from the deployment manager 170 to create a virtual server in accordance with the virtualization technology employed by the enterprise computing environment. Once the new test environment is created, if a user's specific application needs to be installed 725, installation occurs at 735. Following installation at 735, or if no installation is required, environment testing is performed at 745. Testing again can comprise determining whether successful execution of various scenarios of application performance in conjunction with the operating system means the environment is ready for user use. Once testing is completed, results are available at 755 to enable the user to make the decision (506 of FIG. 5) as to whether or not to release the operating system into the production environment maintained by the user.

Returning to FIG. 5, once the user has completed testing and requests an upgrade of the OS to the user's servers at 506, upgrading of the users servers will proceed under the control of the deployment manager depending, once again, on whether a hardware environment is involved or a virtual environment involved.

FIGS. 8 and 9 illustrate the process by which the deployment manager 140 installs a new operating environment utilizing the system manger 170A or 170. FIGS. 8 and 9 are generally similar processes, with variations for the hardware enterprise computing environment 120A in FIG. 8 or virtual enterprise computing environment 120 in FIG. 9, respectively. Generally, upon receiving a request for a new operating system environment, the deployment manager controller 165 contacts the system manager 170 or 170A and issues one or requests for the preparation of a new server or group of servers for operating environment installation. Once space for the new operating environments is available, installation proceeds on instructions from the deployment manager to the servers directly.

FIG. 8 illustrates the deployment process (discussed at 508, above) for updating a set of production environment servers for a user in a hardware enterprise computing environment 120A. Once the deployment manager 140 receives an update request at 810, an evaluation will be made of the user's server cluster to determine the best update process at 815. The update request will include a specification of the environment or environments from the environment library 150 with which the servers should be created. Because hardware must be moved offline, updated, then returned to service, the process must be managed without impacting the level of service provided by the user's server cluster. A determination may be made as to the number of specific hardware servers which can be removed from service at any one time while maintaining the user's service levels. As illustrated in FIG. 4, each user has a service record 480 which maintains a user's service load requirements, based on processing and storage needs. The evaluation which occurs at 815 allows the deployment manager to determine which servers can be removed from service at any given time to maintain the user's required service levels.

The considerations made at 815 to determine what portion of a user's production cluster which may be removed from service may include the type of services and applications the user employs in the cluster, whether the user has specified a minimum level of resources which are required to be available at a given time, whether the user's usage history indicates that low usage times exist with sufficient time frame available to complete the update process, and how much migration of user data is required for each user or subset.

Removing servers from the production cluster during the update process should not interfere with services provide by the user cluster. Consideration may be given to whether data must be moved, whether data or other content needs to be re-installed on the updated servers, whether in-memory objects can safely be shut down and or migrated to other environments and whether services provided by the subset can be adequately handled by the remaining servers in the cluster. Updates should occur during low processing load times to minimize inconvenience to users At 820, a subset of the user's production environment cluster servers is selected to be removed from service. At 825, the system manager 170A is contacted and instructed to prepare specific servers for the environment update. The system manager 170A removes and creates servers in accordance with the discussion above at 720.

Once the new installation location is ready at 827, the subset of production servers available for new environment installation are rebuilt at 830 with a new operating environment as defined in the update request. Rebuilding at 830 is performed by contacting the system manager 170A and instructing the server manager to install the specified environment. In the case of installing an environment including an operating system image, installation occurs by instructing the system manager 170A to write the image to the installation location, and boot the operating system. Once system is booted, installation testing of operation of the environment on the specific hardware may be tested at 835. Installation testing at 835 should not be confused with the previously discussed testing at 740, 745. Testing at 835 is performed to ensure that the installation of the new environment on the hardware has been completed successfully, that all services and applications are operating as expected, and that the server or subset of servers can now be returned to the user's production environment. After installation of the new environment is tested, the servers are returned to the production environment at 840 with their new operating environment. At 840, any specific data, content or objects which were removed and/or backed up from the server before being removed from service are migrated to the updated device.

The update process for a virtualized environment as illustrated in FIG. 9. After an update request is received at 810, the user request is evaluated at 960. Because no servers need be removed from the production environment in a virtual cluster, at 960, the evaluation determines how best to update the user's cluster by adding new virtual servers which can be created and brought online without disturbing existing production servers to complete the update process. Similar considerations to those set forth above with respect to 815 are evaluated, except that no load need be removed from the production environment while new virtual servers are being created. Hence, migration of data or content may occur specifically between a newly created virtual server and the one it will replace. At 965, additional virtual servers are created based on the user's needs by instructing the system manager 170 to create one or more new servers based on the evaluation at 960. The new virtual server will be created in accordance with the requirements of each user, such as those stored in the server configuration data 160 discussed with reference to FIG. 3. Once the system manager 170 indicates that new virtual devices have been created at 967, the server manager is instructed to install the user selected environments at 970. Installation of the selected operating environment occurs in a manner similar to that discussed at 830, except that the location of the installation may be a virtualized storage location and the operating environment booted into a virtual server environment. At 975, each newly installed operating environment is tested to determine whether or not installation has been completed successfully and the environment is operating correctly. Once the installation testing is completed at 975, the virtualized new virtual server may be migrated to the production environment at 980. Once the new virtual server is ready for the production environment, services and data running on cluster servers being replaced are migrated to the newly created operating environment. For each new virtual server created with a new environment, an equivalent virtual server in the user cluster can be migrated at 980. Following migration, servers being replaced can destroyed at 985. Releasing replaced virtual servers frees up additional resources for the creation of additional virtual servers if necessary. If in accordance with the evaluation at 960, an additional set of new virtual servers is necessary at 990, the process returns to 965 and repeats until all virtual servers in the user's cluster (or those subject to the update request) have been upgraded to the new environment per the user's request.

It should be recognized that numerous variations on the above implementations are possible. For example, user clusters may consist of combinations of virtual and hardware servers. Numerous forms of migration of applications, data and services running on existing user servers to new, updated servers (virtual or hardware based) may be utilized in accordance with the present technology. As used herein, the term "user" is not limited to an individual but may comprise any entity controlling a cluster having at least one server. The enterprise administrator may itself comprise a user in the context of the above discussion such that the administrator may utilize the technology to update some or all of the servers in the enterprise-computing environment.

It should further be recognized that the technology need not solely be used for an upgrade process. In the event that a user desired to return the cluster to a previous environment, the technology can be used to return a user cluster to a previous environment.

Figure 10:
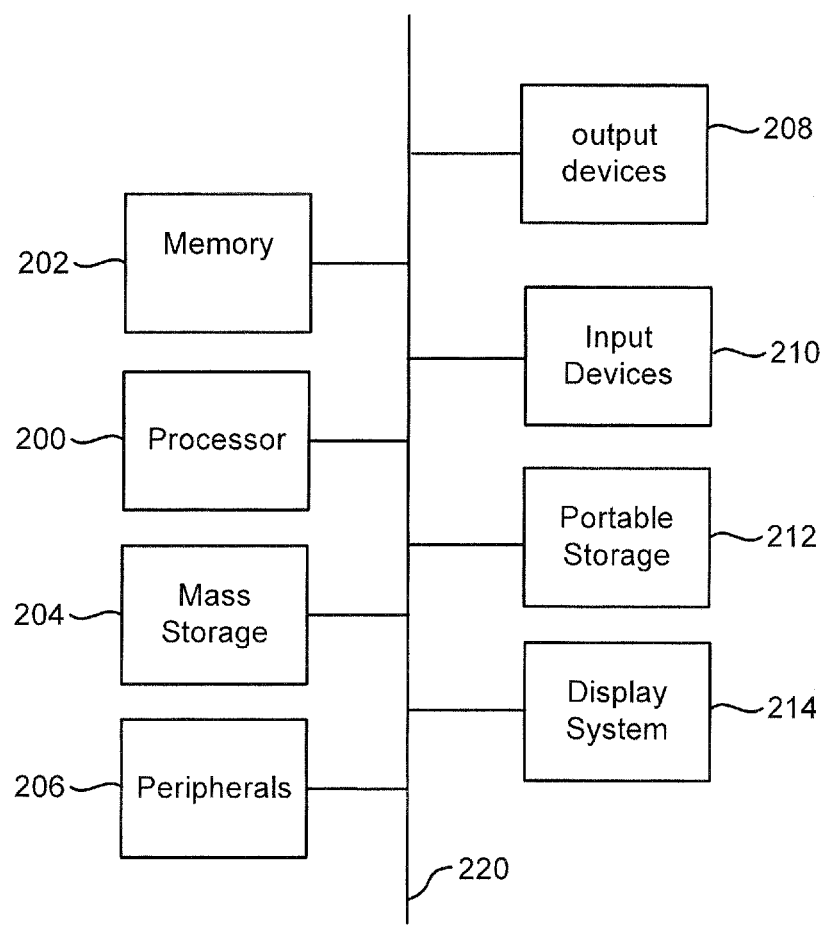
FIG. 10 illustrates an exemplary hardware computing device for the present technology.

FIG. 10 is a high-level diagram of the computing system which can be used to implement any of the computing devices (including the physical hardware) of FIG. 1 and servers of FIG. 2. The computing system of FIG. 2 includes processor 200, memory 202, mass storage device 204, peripherals 206, output devices 208, input devices 210, portable storage 212, and display system 214. For purposes of simplicity, the components shown in FIG. 10 are depicted as being connected via a single bus 220. However, the components may be connected through one or more data transport means. In one alternative, processor 200 and memory 202 may be connected via a local microprocessor bus, and the mass storage device 204, peripheral device 206, portable storage 212 and display system 214 may be connected via one or more input/output buses.

Processor 200 may contain a single microprocessor, or may contain a plurality of microprocessors for configuring the computer system as a multiprocessor system. Memory 202 stores instructions and data for execution by processor 200. If the technology described herein is wholly or partially implemented in software, memory 202 (which may include one or more memory devices) will store the executable code for programming processor 200 to perform the processes described herein. In one embodiment, memory 202 may include banks of dynamic random access memory, high speed cache memory, flash memory, other nonvolatile memory, and/or other storage elements.

Mass storage device 204, which may be implemented with a magnetic disc drive or optical disc drive, is a nonvolatile storage device for storing data and code. In one embodiment, mass storage device 204 stores the system software that programs processor 200 to implement the technology described herein.

Portable storage device 212 operates in conjunction with a portable nonvolatile storage medium, such as a floppy disc, CD-RW, flash memory card/drive, etc., to input and output data and code to and from the computing system of FIG. 2. In one embodiment, system software for implementing the present technology is stored on such a portable medium, and is input to the computer system via portable storage medium drive 212.

Peripheral devices 206 may include any type of computer support device, such as an input/output interface, to add additional functionality to the computer system. For example, peripheral devices 206 may include a network interface for connecting the computer system to a network, a modem, a router, a wireless communication device, etc. Input devices 210 provide a portion of a user interface, and may include a keyboard or pointing device (e.g. mouse, track ball, etc.). In order to display textual and graphical information, the computing system of FIG. 2 will (optionally) have an output display system 214, which may include a video card and monitor. Output devices 208 can include speakers, printers, network interfaces, etc.

The components depicted in the computing system of FIG. 2 are those typically found in computing systems suitable for use with the technology described herein, and are intended to represent a broad category of such computer components that are well known in the art. Many different bus configurations, network platforms, operating systems can be used. The technology described herein is not limited to any particular computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for managing a cluster of provisioned servers, comprising:
    under control of one or more computer systems configured with executable instructions,
        receiving a first request from a user for provisioning a cluster of servers in a production environment, the first request including: (a) a selected operating environment for one or more first servers of the cluster of servers, and (b) service requirements indicating a threshold level of processing or storage to be provided by the cluster of servers;
installing the selected operating environment onto the one or more first servers;
receiving an updated operating environment corresponding to the selected operating environment;
notifying the user of availability of the updated operating environment;
receiving a second request from the user to update the one or more first servers with the updated operating environment in a test environment;
provisioning one or more second servers with the updated operating environment in the test environment;
enabling testing of the one or more second servers in the test environment;
receiving a third request to update the one or more first servers with the updated operating environment in the production environment;
determining a maximum number of the one or more first servers that can be undeployed while maintaining at least the threshold level of processing or storage; and
for a plurality of intervals,
undeploying the maximum number of the one or more first servers;
updating the maximum number of the one or more first servers that have been undeployed with the updated operating environment; and
deploying the maximum number of the one or more first servers that have been updated with the second operating environment in the production environment.

2. The computer-implemented method of claim 1, wherein at least one of the first servers is a virtual server.

3. The computer-implemented method of claim 1, wherein at least one of the first servers is a physical server.

4. The computer-implemented method of claim 1, further comprising:
migrating at least a portion of data of the one or more first servers to the one or more second servers.

5. A deployment management system for a cluster of provisioned servers, comprising:
one or more processors;
memory including instructions when executed to cause the one or more processors to:
install a first operating environment onto one or more servers of the cluster of provisioned servers;
receive a request to update the one or more servers of the cluster of provisioned servers with a second operating environment;
determine a maximum number of the one or more servers of the cluster of provisioned servers that can be undeployed while maintaining at least a threshold level of processing or storage, indicated by service requirements, to be provided by the cluster of provisioned servers; and
for a plurality of intervals,
undeploy the maximum number of the one or more servers of the cluster of provisioned servers;
update the maximum number of the one or more servers of the cluster of provisioned servers that have been undeployed with the second operating environment; and
deploy the maximum number of the one or more servers of the cluster of provisioned servers that have been updated with the second operating environment.

6. The deployment management system of claim 5, wherein the one or more servers are virtual servers.

7. The deployment management system of claim 6, wherein the instructions when executed to cause the one or more processors to update the one or more servers with the second operating environment include causing the one or more processors to:
for the plurality of intervals,
create the maximum number of new virtual servers to use the second operating environment,
wherein the instructions that cause the one or more processors to deploy the maximum number of the one or more servers of the cluster of provisioned servers include causing the one or more processors to deploy the maximum number of the new virtual servers, and
wherein the instructions that cause the one or more processors to undeploy the maximum number of the one or more servers of the cluster of provisioned servers include causing the one or more processors to destroy the maximum number of the one or more servers of the cluster of provisioned servers.

8. The deployment management system of claim 5, wherein the one or more servers are physical servers.

9. The deployment management system of claim 8, wherein the instructions when executed to cause the one or more processors to undeploy the maximum number of the one or more servers of the cluster of provisioned servers include causing the one or more processors to:
remove the maximum number of the physical servers from service in a production environment,
wherein the instructions that cause the one or more processors to deploy the maximum number of the one or more servers of the cluster of provisioned servers include causing the one or more processors to deploy the maximum of the physical servers in the production environment.

10. The deployment management system of claim 5, wherein the instructions when executed further cause the one or more processors to:
obtain the second operating environment, the second operating environment including an update to the first operating environment; and
notify one or more users of availability of the second operating environment.

11. The deployment management system of claim 5, wherein the instructions when executed further cause the one or more processors to:
receive a first request to provision one or more first servers of a first cluster of provisioned servers with the second operating environment, the one or more first servers being provisioned in a test environment;
provision the one or more first servers with the second operating environment in the test environment; and
enable testing of the one or more first servers in the test environment.

12. The deployment management system of claim 11, wherein the instructions when executed further cause the one or more processors to:
migrate at least a portion of data of the cluster of provisioned servers to the one or more first servers.

13. The deployment management system of claim 5, wherein the service requirements further include at least one of a maximum processing load required by the cluster of provisioned servers, a minimum processing load required by the cluster of provisioned servers, a peak load used by the cluster of provisioned, or a peak load time for the cluster of provisioned servers.

14. A non-transitory computer readable storage medium storing instructions for managing a cluster of provisioned servers, the instructions when executed by one or more processors causing the one or more processors to:

receive service requirements indicating a threshold level of processing or storage to be provided by the cluster of provisioned servers;

install a first operating environment onto one or more servers of the cluster of provisioned servers;

receive a request to update the one or more servers of the cluster of provisioned servers with a second operating environment;

determine a maximum number of the one or more servers of the cluster of provisioned servers that can be undeployed while maintaining at least the threshold level of processing or storage; and for a plurality of intervals, undeploy the maximum number of the one or more servers of the cluster of provisioned servers;

update the maximum number of the one or more servers of the cluster of provisioned servers that have been undeployed with the second operating environment; and deploy the maximum number of the one or more servers of the cluster of provisioned servers that have been updated with the second operating environment.

15. The non-transitory computer readable storage medium of claim 14, wherein the one or more servers of the cluster of provisioned servers are virtual servers.

16. The non-transitory computer readable storage medium of claim 15, wherein the instructions when executed to cause the one or more processors to update the one or more servers with the second operating environment include causing the one or more processors to:

for a plurality of intervals, create the maximum number of new virtual servers to use the second operating environment, wherein the instructions that cause the one or more processors to deploy the maximum number of the one or more servers of the cluster of provisioned servers include causing the one or more processors to deploy the maximum number of the new virtual servers, and wherein the instructions that cause the one or more processors to undeploy the maximum number of the one or more servers of the cluster of provisioned servers include causing the one or more processors to destroy the maximum number of the one or more servers of the cluster of provisioned servers.

17. The non-transitory computer readable storage medium of claim 14, wherein the one or more servers of the cluster of provisioned servers are physical servers.

18. The non-transitory computer readable storage medium of claim 17, wherein the instructions when executed to cause the one or more processors to undeploy the maximum number of the one or more servers of the cluster of provisioned servers include causing the one or more processors to:

remove the maximum number of the physical servers from service in a production environment, wherein the instructions that cause the one or more processors to deploy the maximum number of the one or more servers of the cluster of provisioned servers include causing the one or more processors to deploy the maximum number of the physical servers in the production environment.

19. The non-transitory computer readable storage medium of claim 14, wherein the instructions when executed further cause the one or more processors to:

obtain the second operating environment, the second operating environment including an update to the first operating environment; and notify one or more users of availability of the second operating environment.

20. The non-transitory computer readable storage medium of claim 14, wherein the instructions when executed further cause the one or more processors to:

receive a first request to provision one or more first servers of a first cluster of provisioned servers with the second operating environment, the one or more first servers being provisioned in a test environment;

provision the one or more first servers with the second operating environment in the test environment; and enable testing of the one or more first servers in the test environment.

* * * * *